United States Patent [19]

Shuster

[11] Patent Number: 5,525,442
[45] Date of Patent: Jun. 11, 1996

[54] ALKALI METAL BATTERY

[75] Inventor: Nicholas Shuster, Madison, Ohio

[73] Assignee: Westinghouse Electric Corporation, Pittsburgh, Pa.

[21] Appl. No.: 583,062

[22] Filed: Sep. 14, 1990

[51] Int. Cl.$^6$ .................................................. H01M 6/14
[52] U.S. Cl. ........................... 429/194; 429/212; 429/249
[58] Field of Search .................................. 429/194, 212, 429/299

[56] References Cited

U.S. PATENT DOCUMENTS

| | | | |
|---|---|---|---|
| 3,980,498 | 9/1976 | Urbach et al. | 429/64 |
| 4,251,607 | 2/1981 | Yamaki et al. | 429/194 |
| 4,550,064 | 10/1985 | Yen et al. | 429/94 |
| 4,554,222 | 11/1985 | Zarcomb | 429/19 |
| 4,822,698 | 4/1989 | Jackovitz et al. | 429/27 |

OTHER PUBLICATIONS

F. G. Will et al., "Primary Sodium Batteries with Beta–Alumina Solid Electrolyte", J. Electrochemical Society: Electrochemical Science and Technology; vol. 122, No. 4, Apr., 1975, pp. 457–461.

Will et al, *Primary Sodium Batteries–Electrolyte*, J. Electrochemical Soc., Apr., 1975, pp. 457–461.

*Primary Examiner*—Peter A. Nelson

[57] ABSTRACT

An alkali metal battery has an alkali metal anode such as lithium in an organic anolyte and a cathode in an aqueous catholyte. An ion conductive diaphragm allows ions to migrate between the anolyte and the catholyte while limiting the transport of water from the catholyte to the anolyte.

In a preferred embodiment, the ion conductive diaphragm is nonporous so that there is no transport of water ion to the anolyte.

The battery is particularly useful for long durations of up to a week or longer in seawater.

20 Claims, 4 Drawing Sheets

ALKALI METAL BATTERY

The present invention relates to an alkali metal battery which employs an aqueous catholyte and, more particularly, to a long duration battery which may be employed for at least a week in an aqueous environment such as in seawater. The present invention is particularly useful in connection with lithium batteries.

Lithium-water electrochemical systems have been examined under high discharge rate conditions, such as that required for batteries to power electric torpedoes, to take advantage of the high capacity of lithium (3.86 amp-hr/gm) and the free use of ambient seawater as the cathodic reactant. The lithium water reaction proceeds in accordance with the following equations:

Anode: $Li \rightarrow Li^+ + electron$

Cathode: $H_2O \times electron \rightarrow OH^- + \frac{1}{2} H_2$

Overall: $Li + H_2O \rightarrow LiOH + \frac{1}{2} H_2O$

However, lithium-water systems have been slow to develop for long duration applications because of excessively high parasitic corrosion losses caused by the direct reaction of lithium and water. The corrosion reaction proceeds in accordance with the following equation:

Anode: $Li + H_2O \rightarrow LiOH + \frac{1}{2} H_2$

For example, it has been determined that parasitic corrosion can consume as much as twice the amount of lithium that is consumed by the electrochemical reaction in low power tests conducted at temperatures down to about 0° C.–10° C. In addition, the corrosion rate roughly doubles for every ten-degree centigrade rise in temperature. Accordingly, long duration seawater batteries commonly employ magnesium or zinc anodes (see, e.g., U.S. Pat. No. 4,822,698). However, magnesium-water batteries are unreliable under conditions where the oxygen content is less than about 0.5 to 2.0 $mlO_2$/liter since oxygen is required to depolarize the cathode.

It has recently been proposed by the inventor of the present invention that a lithium-water battery system employing a highly caustic aqueous electrolyte solution may be employed in place of a battery based on magnesium-water technology. See in this regard, U.S. patent application Ser. No. 07/583,061, filed Sep. 14, 1990. The highly caustic electrolyte solution maintains a dynamic porous oxide film on the surface of the anode in order to control corrosion at acceptable rates. However, battery systems employing such an electrolyte solution will be subject to a corrosion current of about the same order of magnitude as the useful power-producing electrochemical current. In addition, their useful lithium utilization will be less than about 50%.

SUMMARY OF THE INVENTION

It is an object of the present invention to provide a long duration battery which employs an alkali metal anode and water as its cathodic reactant, but yet is not subject to excessive anode corrosion rates. It is a further object to provide a long duration alkali metal battery which has a high anode utilization. It is also an object of the present invention to provide a battery which is substantially insensitive to both pressure and temperature and, importantly, does not require dissolved oxygen to be present in the water as does a magnesium-water battery.

With these objects in view, the invention resides in a battery having an alkali metal anode in an organic anolyte and a cathode in an aqueous catholyte. Preferably the anode is sodium or lithium. An ion conductive diaphragm means in contact with the organic anolyte and the aqueous catholyte allows ions to migrate between the anolyte and the catholyte while limiting the transport of water from the catholyte to the anolyte. By limiting the transport of water into the anolyte, there is less water available to corrode the anode. Such a battery may be employed in seawater or in any other aqueous environment for long durations of up to a week or more.

In a preferred embodiment of the present invention, the ion conductive diaphragm means is nonporous. Thus, water transport through the ion conductive means is entirely prevented. Because there is essentially no corrosion due to water infiltration into the anolyte, the anode weight and the quantity of anolyte are substantially less in a battery having a nonporous diaphragm than in other lithium batteries which only employ an aqueous electrolyte.

DESCRIPTION OF THE DRAWINGS

The invention will become more readily apparent from the following description of a preferred embodiment thereof shown, by way of example only, in the accompanying drawings, wherein.

DESCRIPTION OF A PREFERRED EMBODIMENT

Figure 1:
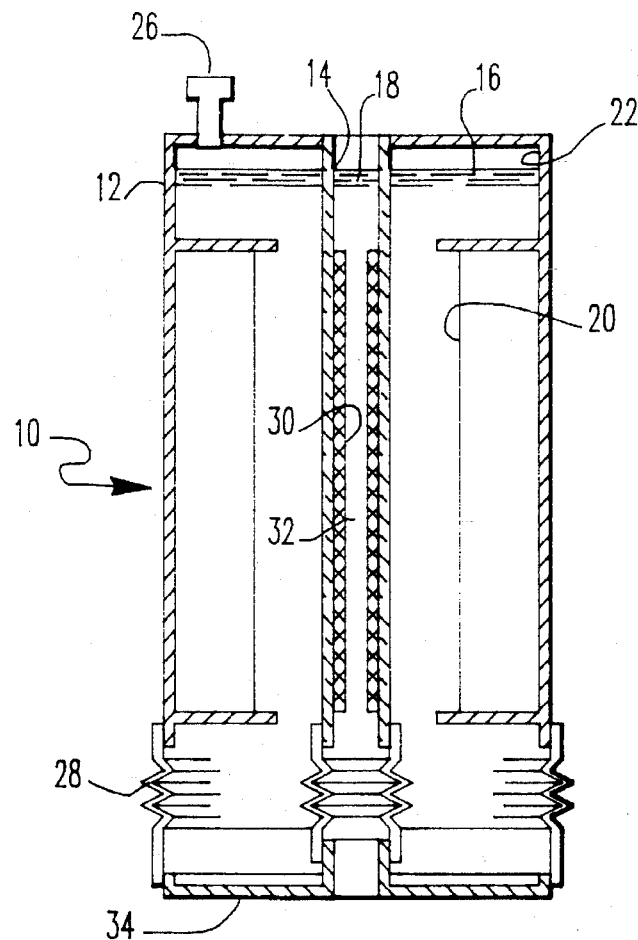
FIG. 1 is a schematic illustration of an alkali metal battery embodying the present invention, which is designed for long duration deep ocean applications.

FIG. 1 generally shows an alkali metal battery 10 embodying the present invention which is particularly designed for use in a deep ocean environment for long durations of a year or more. The battery may be employed to power undersea acoustical sensing devices (not shown) or for other low power uses.

The battery 10 has a battery housing 12 with an ion conducting diaphragm means 14 disposed between an anode compartment 16 and a cathode compartment 18. The battery housing 12 may be stainless steel, or a lighter weight composite plastic or other suitable material.

The diaphragm means 14 allows ions to migrate between the anode compartment 16 and the cathode compartment 18 while limiting the transport of water into the anode compartment 16. The diaphragm means 14 shown is an open-ended cylinder which is preferably a nonporous solid electrolyte such as a sodium or a lithium beta alumina ceramic or the like. Advantageously, nonporous materials substantially prevent any corrosion of an anode 20 due to the transport of water into the anode compartment 16. Corrosion, if any, in the anode compartment 16 is due to moisture originally present in the system. The cylinder may be open-ended as shown or closed at one end. Also, other configurations may be employed. For example, the diaphragm means 14 may be an outwardly facing window in the battery housing 12.

The diaphragm means 14 may be a porous material such as a fused glass frit or an organic polymer which substantially limits the transport of water from the cathode compartment 18 into the anode compartment 16. Preferably, an organic polymer does not have macroscopic pores which collapse at high pressures of 6,000 meters (20,000 feet) water. A preferred organic polymer is a fluorinated polymer having carboxylic and sulfonic acid groups attached thereto. Such polymers are commercially marketed under the trade designation NAFION by the E. I. du Pont de Nemours Corporation of Wilmington, Delaware. Porous diaphragm means 14 such as glass frit and hydrophilic polymers permit small amounts of organic anolyte to migrate into the cathode compartment 18 where it may inhibit the growth of biological and plant life.

The anode compartment 16 preferably contains a lithium anode 20 in an organic anolyte 22. The lithium anode 20 may be metallic lithium or a lithium alloy of aluminum such as is disclosed by U.S. Pat. No. 3,980,498. The anode 20 is most preferably metallic lithium, however. In another embodiment of the present invention, a sodium or other alkali metal anode may be employed. The lithium anode 20 may be configured as a cylinder (as is shown) or, alternatively, as a substantially flat vertical or horizontal disc (not shown) preferably having one surface in contact with the organic anolyte 22.

The organic anolyte 22 generally comprises any suitable organic liquid which will not aggressively attack the lithium anode 20 and contains a salt which is ionizable in the organic liquid. N-methyl-2-pyrrolidinone and dimethyl sulfoxide (DSMO) are preferred organic liquids because they do not corrode lithium, are not viscous at low temperatures of about 0° C., and because sufficient amounts of salts such as lithium chloride will dissolve therein at 0° C. to operate the battery 10. Other suitable salts include lithium perchlorate, lithium tetrafluoroborate, and lithium hydroxide. In addition, other alkaline metal salts and alkaline earth salts may be employed.

The cathode compartment 18 generally contains a cathode 30 which may be a low overvoltage nickel mesh or screen, a steel wool or other suitable material in an aqueous catholyte 32. Water is reduced at the cathode 32 in the course of the electrochemical reaction to produce hydrogen gas and hydroxide ions.

The battery 10 may have a differential pressure relief valve 26 set at about 100 mm Hg (2 psi) or other suitable pressure differential to vent hydrogen (if any) which may be produced by parasitic corrosion or other gases present in the anode compartment 16. Also, the battery 10 may have a bellows 28 or other pressure-compensating device to compensate for high ambient pressures to which the battery 10 might be subjected. For example, a battery 10 operating under 20,000 feet of water would be exposed to a pressure of about 600 atmospheres. Such a bellows 26 may be made of a neoprene or other suitable material which is compatible with the organic anolyte solution. Where bellows 28 are employed, a closure 34 is needed to contain the organic anolyte 22 in the anode compartment 16.

Demonstration tests were conducted on bench scale lithium batteries embodying the present invention to determine their performance characteristics under seawater conditions for long durations of up to a week or more.

Figure 2:
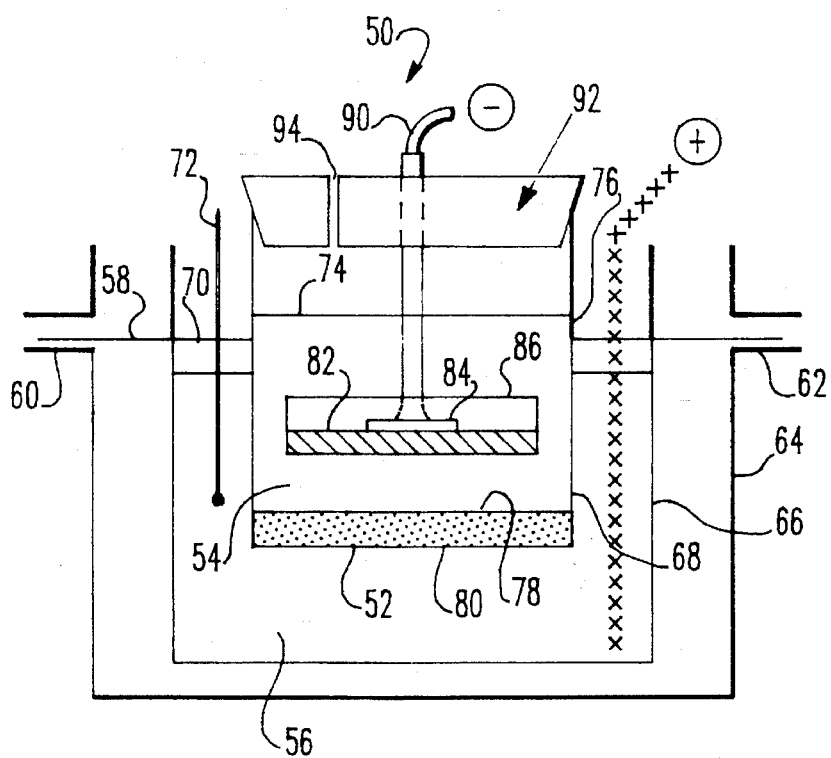
FIG. 2 is a schematic illustration of a demonstration battery embodying the present invention, which has a horizontally disposed porous ion conductive diaphragm means.

FIG. 2 illustrates a demonstration battery 50 embodying the present invention, which had a porous diaphragm 52 disposed between an organic anolyte 54 and an aqueous catholyte 56. The battery 50 was maintained in a chilled saltwater bath 58, which was circulated through the inlet connection 60 and outlet connection 62 of a beaker 64 by a refrigeration unit (not shown), to simulate cold ocean conditions. The battery 50 generally comprised concentric beakers 66 and 68 which contained the catholyte 56 and the anolyte 54, respectively.

The catholyte 56 was natural seawater previously purged with inert gas to remove substantially all of the dissolved oxygen in order to best simulate ocean areas which are nearly anaerobic. A mineral oil layer 70 was employed to ensure an oxygen-free environment. Also, the seawater temperature was maintained between about 8° C. and 13° C. as indicated by a thermometer 72. A concentric nickel screen 74 was employed as a cathode.

The inner beaker 68 generally contained the anolyte 54, which was N-methyl-2-pyrrolidinone saturated with lithium chloride. The porous diaphragm 52, which formed the bottom of the inner beaker 68, was a 3 mm (⅛-inch) thick fused glass frit having a nominal pore diameter of 4–5 μ. As is shown in FIG. 2, the difference in liquid level 76 between the anolyte 54 and the catholyte 56 was employed to maintain a slightly higher pressure on the face 78 of the diaphragm 52 contacting the anolyte 54 to limit the transport of catholyte 56 across face 80 into the anolyte 54. Excessive level differences 76 were avoided to reduce the loss of anolyte. A lithium anode 82 (and a copper current collector disk 84) was pressure-bonded to a plexiglass electrode holder 86 and coated with an epoxy along its edges to provide a 6.5 cm$^2$ (one square inch) active frontal face 88. The lithium anode 82 and collector disk 84 were connected to a load device (not shown) via an electrical conductor 90 extending through a stopper 92 having a vent 94.

Figure 3:
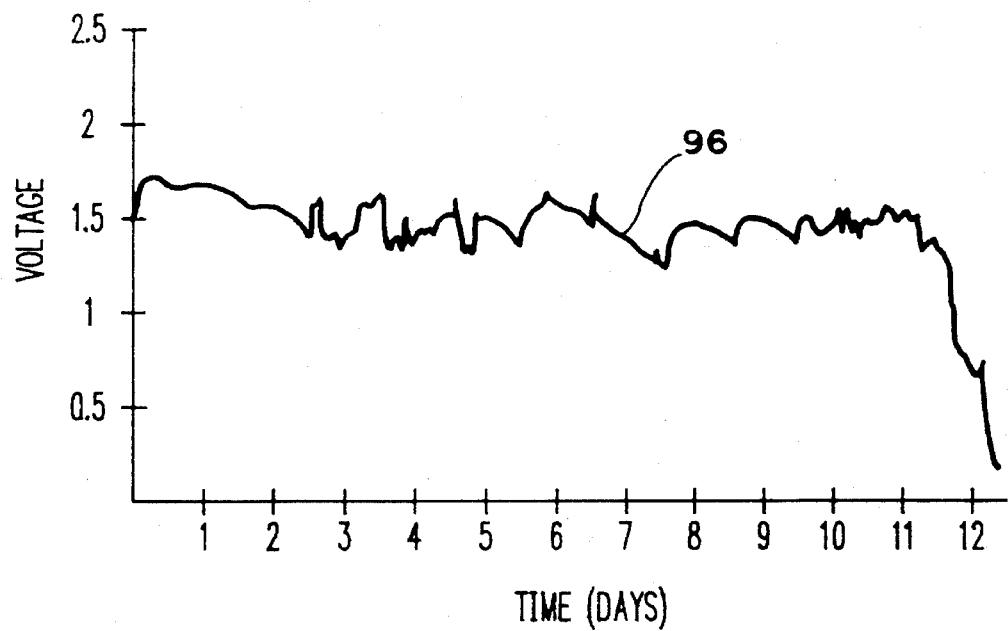
FIG. 3 traces the voltage of the battery of FIG. 2 as a function of time, which was recorded in a two-week test.

FIG. 3 indicates the voltage output of the battery 50 which was discharged over a twelve-day period at about 1.2–1.3 milliamps. FIG. 3 generally indicates that the battery 50 reliably produced a stable voltage of about 1.4 volts for over eleven days before terminating the test. The amplitude variations of the curve 96 of FIG. 3 reflect temperature changes between 8° C. and 13° C. and, perhaps, water flow variations through the glass frit diaphragm 84. In addition, the usable specific energy of the battery 50 was 2,650 watt-hrs/kg lithium, which was a 25% increase over the best observed specific energy levels previously achieved by low rate batteries in which a lithium anode and a nickel cathode are disposed in an alkaline aqueous electrolyte.

Figure 4:
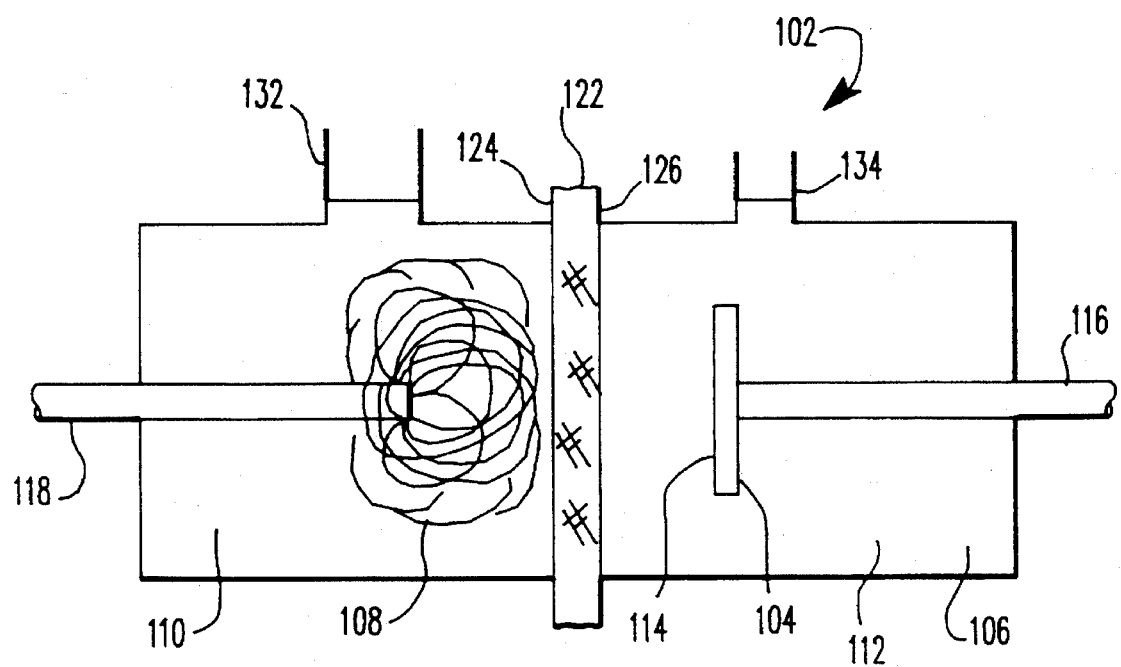
FIG. 4 is a schematic illustration of a second demonstration battery embodying the present invention, which has a vertically disposed porous ion conductive diaphragm means.

FIG. 4 illustrates a demonstration battery 102 in which an anode 104 in an anode compartment 106 and a cathode 108 in a cathode compartment 110 are disposed in an organic electrolyte 112. Water was introduced into the cathode compartment 110 with a syringe from time to time. This battery 102 simulates a battery in which the cathode is disposed inside the battery housing instead of outside of the housing as is shown in FIG. 1. A practical battery similar to the battery 102 may have a porous ion-conducting diaphragm means (not shown) such as a glass frit or a hydrophilic organic polymer in its housing for introducing water into the cathode compartment. Preferably, the cathode would be disposed between the diaphragm means and the anode so that the water would react with the cathode as it diffuses through the organic anolyte and into the anode compartment.

The battery 102 of FIG. 4 had an epoxy-coated anode 104 with a 15.5 cm$^2$ frontal face 114 which reacted with the anolyte 112. The anode 104 was connected with a load device (not shown) via an electrical conductor 116. The battery 102 had a steel wool cathode 108 as shown, although its commercial counterpart would preferably be nickel or a nickel coated metal such as steel. The cathode 108 was connected to a load device (not shown) via a conductor 118.

A screen 122 held between two flanges 124, 126 was employed to prevent contact between the anode 104 and the cathode 108. The battery 102 had two connections 132, 134 for venting hydrogen bubbles from the anode 104 and the cathode 108. Also, the connection 132 above the cathode 108 was conveniently employed to insert a syringe into the cathode compartment 110.

Figure 5:
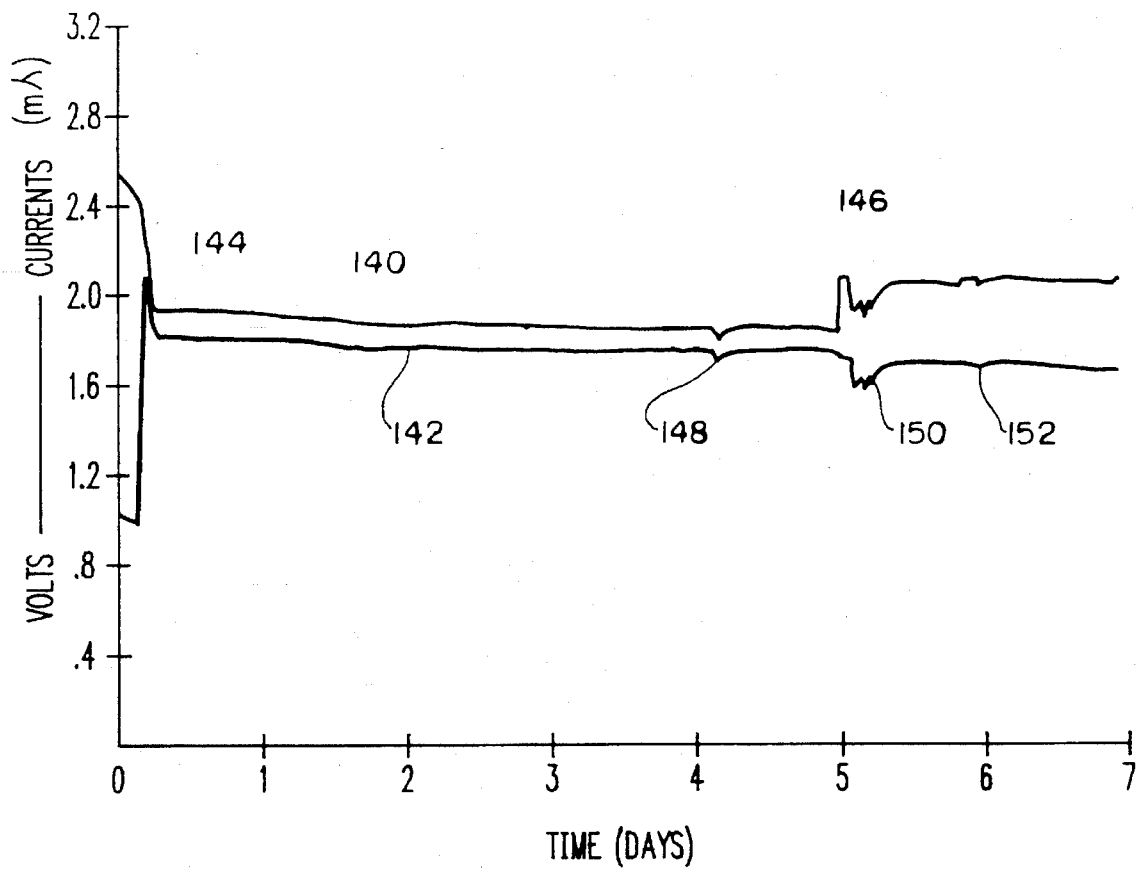
FIG. 5 traces the voltage and current of the battery of FIG. 4 as a function of time, which were recorded in a week-long test.

FIG. 5 indicates the observed characteristics of the battery 102 at room temperature (about 20° C.) in a test which simulated warm water conditions. The battery 102 employed N-methyl-2-pyrrolidinone saturated with lithium chloride as an anolyte, seawater as a syringe-fed catholyte, and a discharge rate of about 0.1 milliamp/cm$^2$ of anode area. Such a room temperature test simulates warm ocean conditions where corrosion would be at a maximum. Curve 140 traces the observed current as a function of time and curve 142 traces the observed voltage. The changes at 144 and 146 indicate load changes to increase the current and the changes at 148, 150, and 152 reflect ambient temperature fluctuations.

FIG. 5 shows that the battery 102 continuously discharged at a voltage of about 1.6 volts and a current density of about 0.1 milliamp/cm$^2$ for at least a week. In addition, the calculated specific energy of this battery, based on the lithium consumed, was 5,360 watt-hrs/kg, which represents a nearly three-fold improvement over typical room temperature values observed with batteries employing only alkaline aqueous electrolytes. About 86% of the consumed lithium was consumed electrochemically while 14% was consumed by corrosion.

Figure 6:
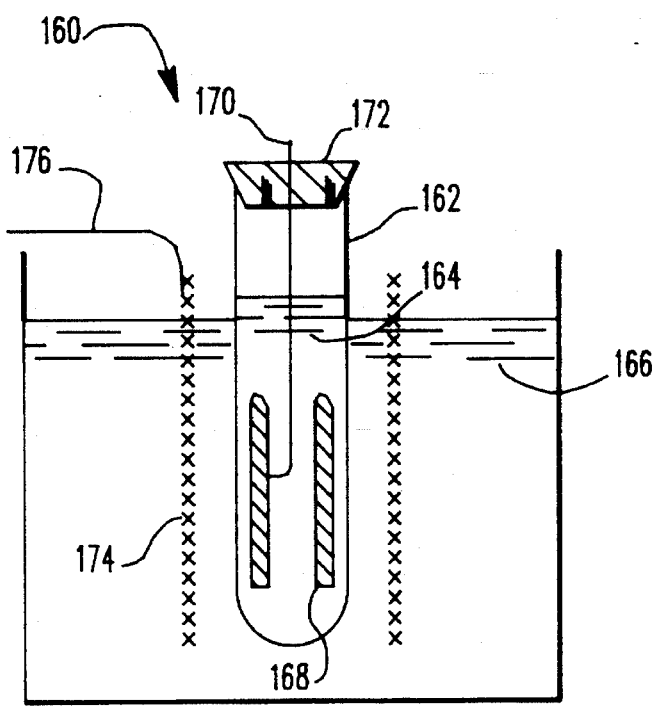
FIG. 6 is a schematic illustration of a third demonstration battery embodying the present invention, which has a vertically disposed nonporous ion conductive diaphragm means.

FIG. 6 illustrates a demonstration battery 160 embodying the present invention which employed a nonporous ion conductive diaphragm 162 between an organic anolyte 164 (which was N-methyl-2-pyrrolidinone saturated with lithium chloride) and a natural seawater catholyte 166. The diaphragm 162 completely prevented any transport of aqueous catholyte 166 into the anolyte 164 where parasitic corrosion of the anode 168 would otherwise occur. The diaphragm 162 also prevented the loss of any organic anolyte 164 to the catholyte 166 which occurs with porous diaphragms. Thus, only a very small quantity of organic anolyte would be necessary in a commercial battery.

The diaphragm 162 of battery 160 was a sodium beta-alumina ceramic tube having a 2.5 cm (1-inch) diameter and a 10 cm (4-inch) length. A diaphragm of a commercial counterpart of the battery 160 may have a similar cylindrical configuration (as is shown in FIG. 1) or may have a solid configuration similar to the diaphragm 52 of FIG. 2. The beta-alumina diaphragm may be any beta-alumina ceramic similar to the type of solid electrolytes previously employed to separate sodium-mercury amalgams from halogens, water, and air in the primary batteries as described by "Primary Sodium Batteries with Beta-Alumina Solid Electrolyte," F. G. Will et al., *J. of the Electrochemical Society*, Vol. 122, No. 4, pp. 457–461 (April 1975). Sodium beta-alumina diaphragms are commercially available from Ceramatec, Inc. of Salt Lake City, Utah. In a preferred embodiment of the invention, the sodium beta-alumina structure is ion-exchanged in a molten salt bath containing lithium salts to a lithium beta-alumina structure. A lithium beta-alumina structure will be subject to less stress than will a sodium beta-alumina structure as lithium ions migrate through the diaphragm. In addition to alkaline metal beta-alumina structures, alkaline earth and other metal beta-alumina structures may be useful. In addition, ion conductive ceramics may be advantageously employed such as those commercially available under the trade designations LISICON, NASICON and LITHAFRAX may be useful in some batteries.

The lithium anode 168 of the battery 160 had a cylindrical configuration with a total surface area of 26.9 cm$^2$ which was concentrically spaced from the diaphragm 162. The anode 168 was connected to a load device (not shown) via a conductor 170 which extended through a cork stopper 172. The cathode 174 was a nickel screen having a surface concentrically spaced from the diaphragm 162 and was connected to the load device via a conductor 176.

Figure 7:
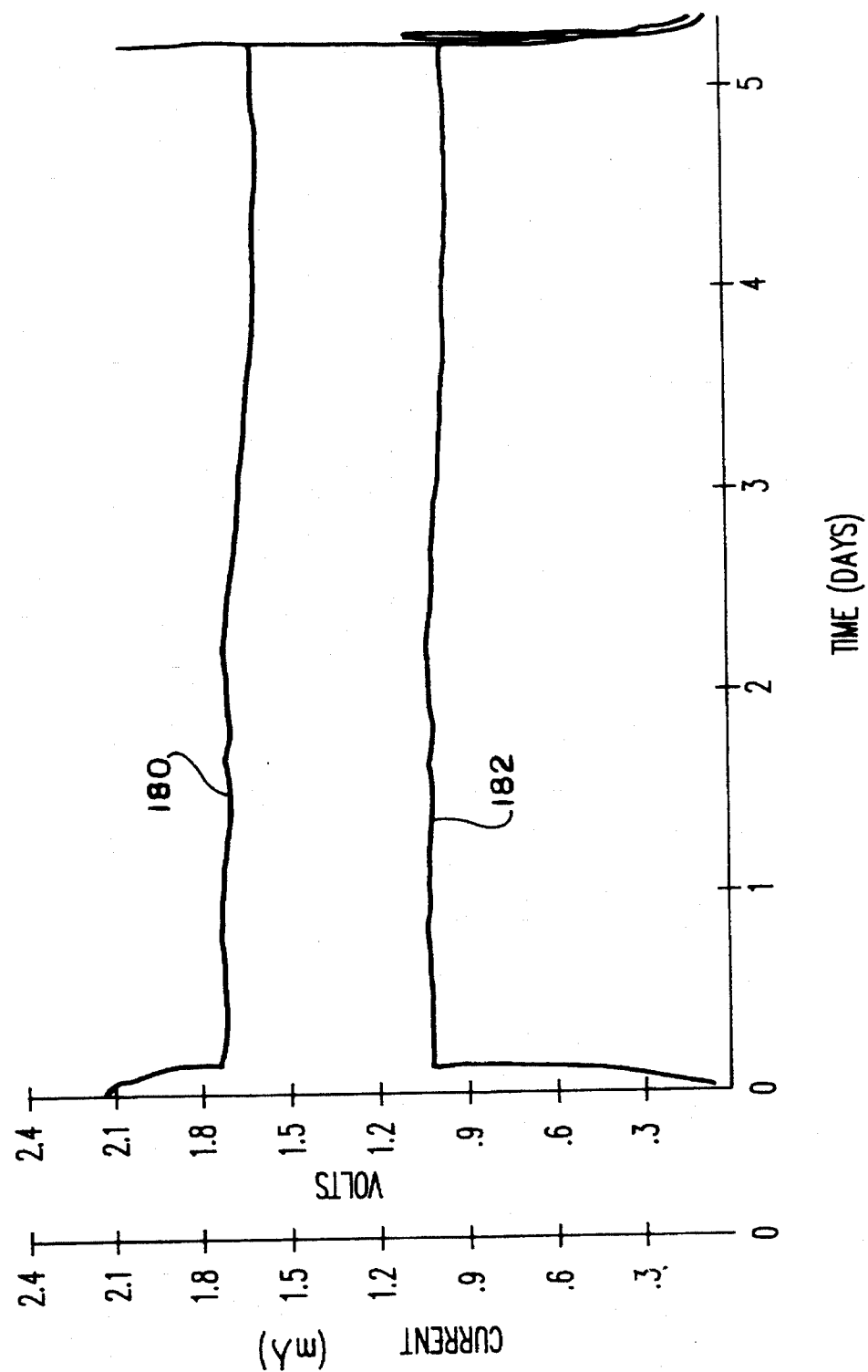
FIG. 7 traces the voltage and the current of the battery of FIG. 6 as a function of time, which were recorded in a week-long test.

FIG. 7 indicates the room temperature (about 20° C.) performance characteristics of the battery 160 of FIG. 6. Trace 180 indicates the voltage of the battery 160 and trace 182 indicates the current (which was about 0.04 mA/cm$^2$ at 1.0 mA). As these traces 180 and 182 indicate, the battery 160 was very stable for about five days until the test was terminated. There was no parasitic corrosion of the anode 168 because there was no infiltration of aqueous catholyte 166. Such a battery will have a very high specific energy of more than 6,000 watt-hrs/kg lithium.

Advantageously, batteries embodying the present invention activate immediately upon immersion in water because the lithium anode is disposed in an organic anolyte containing an ionized salt. Because there is little or no water in the anolyte (depending upon whether a porous or nonporous diaphragm means is employed), relatively little anolyte is needed. Also, these batteries are inherently safe to store and handle because the lithium anode will not be in contact with water at any time.

Importantly, batteries embodying the present invention will be lightweight where materials such as composite plastics are employed as the housings. Batteries embodying the present invention having specific energies of over 5000 Wh/kg lithium anode and lithium utilizations of over 80% (as has been demonstrated above) will have system specific energies of over about 1300 Wh/kg based on the total weight of the battery. This is more than 70% greater than the 770 Wh/kg total specific energy requirement of low power batteries useful for acoustical sensors and other low power, long duration underwater applications.

What is claimed is:

1. An alkali metal battery comprising:
   an alkali metal anode in an organic anolyte;
   a cathode in an aqueous catholyte;
   an ion conductive diaphragm means in contact with the organic anolyte and with the aqueous catholyte for allowing ions to migrate between the anolyte and the catholyte while limiting transport of water from the catholyte to the anolyte.

2. The battery of claim 1, wherein the alkali metal is sodium.

3. The battery of claim 1, wherein the alkali metal is lithium.

4. The battery of claim 1, wherein the ion conductive diaphragm means is porous.

5. The battery of claim 4, wherein the ion conductive diaphragm means is a glass frit having pores with diameters of about 4 to 5 microns.

6. The battery of claim 4, wherein the ion conductive diaphragm means comprises a fluorocarbon polymer.

7. The battery of claim 4, wherein the ion conductive diaphragm means comprises a porous polymer having a nominal pore diameter of 0.02 microns to 4 microns.

8. The battery of claim 1, wherein the ion-conducting conducting diaphragm means is nonporous.

9. The battery of claim 8, wherein the ion-conducting diaphragm means is comprised of alkaline metal beta-alumina.

10. The battery of claim 9, wherein the battery is comprised of sodium beta-alumina.

11. The battery of claim 9, wherein the battery is comprised of lithium beta-alumina.

12. The alkali metal battery of claim 1, having a specific energy of at least about 2500 watt-hours per kilogram of lithium when the battery is discharged at about 1.4 volts in an aqueous environment at about 10° C. and ambient pressure.

13. The alkali metal battery of claim 1, having a specific energy of at least about 5,000 watt-hours per kilogram of lithium when the battery is discharged at about 1.6 volts in an aqueous environment at about 20° C.

14. The alkali metal battery of claim 1, having a specific energy of at least about 6000 watt-hours/kg. of lithium when the battery is discharged at about 1 volt in an aqueous environment at about 20° C.

15. The alkali metal battery of claim 1 wherein at least about 80 weight percent of the anode is consumed electrochemically when the battery is discharged at about 1.6 volts in an aqueous environment at about 20° C.

16. A lithium battery, comprising:

a lithium anode in an organic anolyte containing an ionized lithium salt;

a cathode in an aqueous catholyte; and a nonporous solid electrolyte disposed between the anolyte and the catholyte.

17. The lithium battery of claim 16, wherein the solid electrolyte comprises sodium beta alumina.

18. The lithium battery of claim 6, wherein the solid electrolyte comprises lithium beta alumina.

19. A sodium battery, comprising:

a sodium anode in an organic anolyte containing an ionized sodium salt;

a cathode in an aqueous catholyte; and a nonporous solid electrolyte disposed between the anolyte and the catholyte.

20. The sodium battery of claim 15, wherein the solid electrolyte comprises sodium beta alumina.

* * * * *